(12) United States Patent
Reichert et al.

(10) Patent No.: US 12,031,812 B2
(45) Date of Patent: Jul. 9, 2024

(54) METHOD AND SYSTEM FOR DETERMINING A THREE-DIMENSIONAL DEFINITION OF AN OBJECT BY REFLECTOMETRY

(71) Applicant: VIRELUX Inspection Systems Sàrl, Differdange (LU)

(72) Inventors: Tom Reichert, Differdange (LU); Gérard Baseotto, Marly (FR)

(73) Assignee: VIRELUX Inspection Systems Sàrl, Differdange (LU)

( * ) Notice: Subject to any disclaimer, the term of this patent is extended or adjusted under 35 U.S.C. 154(b) by 0 days.

(21) Appl. No.: 17/769,543

(22) PCT Filed: Oct. 16, 2020

(86) PCT No.: PCT/EP2020/079227
§ 371 (c)(1),
(2) Date: Apr. 15, 2022

(87) PCT Pub. No.: WO2021/074390
PCT Pub. Date: Apr. 22, 2021

(65) Prior Publication Data
US 2024/0125594 A1    Apr. 18, 2024

(30) Foreign Application Priority Data

Oct. 16, 2019    (LU) ........................................ 101454

(51) Int. Cl.
*G01B 11/25*    (2006.01)
*G01B 5/00*    (2006.01)
(Continued)

(52) U.S. Cl.
CPC ........ *G01B 11/2545* (2013.01); *G01B 5/0025* (2013.01); *G01B 11/167* (2013.01);
(Continued)

(58) Field of Classification Search
CPC ............ G01B 11/2513; G01B 11/2522; G01B 5/0025; G01B 15/02; G01B 7/00;
(Continued)

(56) References Cited

U.S. PATENT DOCUMENTS

2009/0221874 A1    9/2009    Vinther et al.
2015/0324991 A1*    11/2015    Schmidt ............... H04N 13/243
348/136
(Continued)

FOREIGN PATENT DOCUMENTS

DE    102017210558 B3    11/2018
EP    1884740 A2    2/2008
(Continued)

OTHER PUBLICATIONS

International Search Report for corresponding PCT/EP2020/079227 dated Jan. 21, 2021.
(Continued)

*Primary Examiner* — Michael P Stafira
(74) *Attorney, Agent, or Firm* — Sandberg Phoenix & von Gontard, P.C.

(57) ABSTRACT

A method and system for scanning an outer surface of a three-dimensional object, the outer surface being reflective, the method comprising the following steps: (a) projecting a light pattern on the object with a relative movement between the light pattern and the object; (b) recording with cameras images of the light pattern reflected by the outer surface during the relative movement; (c) processing the recorded reflection images by identifying the outline of the light pattern and determining from the outline characteristics of the outer surface; wherein the light pattern comprises at least one homogenously illuminated strip extending transversally to a direction of the relative movement with at least one border with a non-straight profile so as to form a non-
(Continued)

constant width of the strip; and in step (c) the speed of the relative movement is taken into account for determining a three-dimensional definition of the outer surface.

20 Claims, 2 Drawing Sheets

(51) Int. Cl.
*G01B 11/16* (2006.01)
*G01B 11/24* (2006.01)
*G01N 21/88* (2006.01)

(52) U.S. Cl.
CPC .. *G01B 11/2441* (2013.01); *G01N 2021/8864* (2013.01); *G01N 2201/0631* (2013.01)

(58) Field of Classification Search
CPC . G01B 7/003; G01B 7/02; G01B 7/14; G01B 7/30; G01B 11/02; G01B 11/0625; G01B 2210/56; G01B 11/12; G01B 11/2408; G01N 21/8806; G01N 21/8851; G01N 21/93; G01N 27/44795; G01N 22/00; G01N 27/72; G01N 2021/4709; G01N 21/21; G01N 21/47; G01N 21/4738; G01N 2201/061; G01N 27/44704; G01N 27/82

See application file for complete search history.

(56) References Cited

U.S. PATENT DOCUMENTS

2017/0366801 A1* 12/2017 Horesh ................ H04N 13/296
2018/0012350 A1* 1/2018 Gangitano ......... G01N 21/8806

FOREIGN PATENT DOCUMENTS

| EP | 3385781 A1 | 10/2018 | |
| FR | 3077143 A1 | 7/2019 | |
| JP | H10509238 A * | 9/1998 | |
| WO | WO-2009083248 A1 * | 7/2009 | ......... G01B 11/2509 |
| WO | 2018130421 A1 | 7/2018 | |
| WO | 2018233780 A1 | 12/2018 | |
| WO | WO-2019093959 A1 * | 5/2019 | |
| WO | 2020073065 A1 | 4/2020 | |

OTHER PUBLICATIONS

Written Opinion for corresponding PCT/EP2020/079227 dated Jan. 21, 2021.

* cited by examiner

METHOD AND SYSTEM FOR DETERMINING A THREE-DIMENSIONAL DEFINITION OF AN OBJECT BY REFLECTOMETRY

The present invention is the US national stage under 35 U.S.C. § 371 of International Application No. PCT/EP2020/079227 which was filed on Oct. 16, 2020, and which claims the priority of application LU 101454 filed on Oct. 16, 2019 the contents of which (text, drawings and claims) are incorporated here by reference in its entirety.

FIELD

The invention is directed to the field of reflectometry, more particular to the field of determination of characteristics of an outer surface of an object by reflectometry.

BACKGROUND

Prior art patent document published EP 3 385 781 A1 discloses a system and a method for detecting by reflectometry defects in specular or semi-specular surfaces like those on a bodywork of a vehicle. The system comprises a frame forming a tunnel through which a vehicle can pass. Illuminating devices are provided on the ceiling of the tunnel for projecting light patterns on the horizontal portions of the bodywork of the vehicle, i.e., essentially the roof and the bonnet. Cameras are attached to the ceiling and side portions of the tunnel for recording images of the light patterns reflected by the bodywork. The light pattern is of the checkerboard type, i.e., with a periodic pattern of light and shade. The recorded reflection images are then processed for detecting dents and/or undulations, based on local grey variations in two dimensions. Thereafter a three-dimensional treatment is processed, based among other on statistical considerations, for refining the initial two-dimensional treatment, i.e., for filtering out false detections thereby and increasing the detection reliability. How the three-dimensional treatment is processed is however not detailed and also it is not clear how this increases the detection reliability.

Prior art patent document published FR 3 077 143 A1 discloses also a system and a method for detecting by reflectometry hail impacts in a bodywork of a vehicle. The system comprises a frame forming a tunnel through which a vehicle can pass, and an inverted U-shaped detection device supported in translation by the frame. The detection device comprises an illuminating device that projects a light pattern made of a single straight light strip onto the bodywork. The detection device comprises also a series of detecting devices comprising cameras and distance sensors, mounted on the inverted U-shaped frame of the detection device and thereby movable with the light pattern along the vehicle. The reflection images recorded by the different cameras are merged for forming a global image of the bodywork part, with adjacent light strips as if these strips were produced by a multiple illuminating device. The hail impacts are then detected by deformations of the light strips of the light pattern.

Prior art patent document published WO 2018/233780 A1 discloses also a system and a method for detecting by reflectometry hail impacts in a bodywork of a vehicle. The system comprises an inverted U-shaped arch through which the vehicle can pass. A series of parallel straight light strips are provided on the inner side of the arch for projecting light strips onto the bodywork of the vehicle while travelling through the arch. A series of cameras and three-dimension cameras are also provided on the inner side of the arch for recording reflection images of the light pattern.

Prior art patent document published WO 2018/130421 A1 discloses also a system and a method for detecting by reflectometry hail impacts in a bodywork of a vehicle, similar to the one of the preceding reference WO 2018/233780 A1.

Although some of the above references indicate that three-dimensional data are obtained, this information is only local at the damages. None of the cited references provides a three-dimensional definition of whole portions of surface that are recorded and processed.

SUMMARY

The invention has for technical problem to overcome at least one of the drawbacks of the prior art. More specifically, the invention has for technical problem to provide a method and a system for determining by reflectometry a three-dimensional definition of the outer surface of an object.

The invention is directed to a method for scanning an outer surface of a three-dimensional object, the outer surface being reflective, the method comprising the following steps: (a) projecting a light pattern on the object with a relative movement between the light pattern and the object; (b) recording with cameras images of the light pattern reflected by the outer surface during the relative movement; (c) processing the recorded reflection images by identifying the outline of the light pattern and determining from the outline characteristics of the outer surface; wherein the light pattern comprises at least one homogenously illuminated strip extending transversally to a direction of the relative movement with at least one border with a non-straight profile so as to form a non-constant width of the strip; and in step (c) the speed of the relative movement is taken into account for determining a three-dimensional definition of the outer surface.

According to an exemplary embodiment, the speed of the relative movement is determined, calibrated, checked and/or readjusted in step (c) by processing the recorded reflection images.

According to an exemplary embodiment, step (b) comprises recording direct images of the light pattern, i.e., without reflection.

According to an exemplary embodiment, the speed of the relative movement is determined, calibrated, checked and/or readjusted in step (c) by processing the recorded direct images.

According to an exemplary embodiment, in steps (a) and (b) the object is at standstill and the light pattern is moving.

According to an exemplary embodiment, the cameras in step (b) are immobile so as to record fixed portions of object respectively.

According to an exemplary embodiment, the light pattern is formed on an arch extending around the object, the light patterns being projected towards a centre of the arch.

According to an exemplary embodiment, the light pattern comprises two of the at least one homogenously illuminated strip.

According to an exemplary embodiment, in step (c) determining a three-dimensional definition of the outer surface is based on displacement of at least one of the borders of the at least one homogeneously illuminated strip, correlated with the speed of the relative movement and variations of the width of the at least one homogeneously illuminated strip.

According to an exemplary embodiment, the non-straight profile of the at least one border of the at least one homogeneously illuminated strip is periodic.

According to an exemplary embodiment, each period of the non-straight profile of the at least one border of the at least one homogeneously illuminated strip comprises an aperiodic sub-profile.

According to an exemplary embodiment, the number of periods per non-straight profile is greater than 2 and/or less than 10.

According to an exemplary embodiment, in step (c) local deformations of the outer surface are determined by detecting local variations of the non-straight profile of the at least one border of the at least one homogeneously illuminated strip.

According to an exemplary embodiment, the object is a vehicle with bodywork and the deformations are associated to hail damages to the bodywork.

The invention is directed to a system for scanning an outer surface of a three-dimensional object, comprising an illuminating device configured for producing a light pattern and for a movement of the light pattern relative to the object; cameras configured for recoding images of the light pattern reflected by the outer surface during the relative movement; computing unit connected with the camera and configured for processing the recorded reflection images by identifying the outline of the light pattern and determining from the outline characteristics of the outer surface; wherein the light pattern comprises at least one homogenously illuminated strip extending transversally to a direction of the relative movement with at least one border with a non-straight profile so as to form a non-constant width of the strip; and the computing unit is configured for carrying out the method of the invention.

According to an exemplary embodiment, the illuminating device forms an arch with a C-shape whose opening is oriented downwardly.

According to an exemplary embodiment, the system further comprises two parallel and horizontal rails supporting the illuminating device movable in translation along the rails.

According to an exemplary embodiment, the system further comprises two side frames supporting the two parallel and horizontal rails and the cameras.

According to an exemplary embodiment, the system further comprises a motorisation of the movement in translation of the illuminating device along the two parallel and horizontal rails, the motorization comprising an output configured to provide to the computing unit information about the speed of the relative movement.

According to an exemplary embodiment, the illuminating device comprises illuminating displays for producing the light pattern, the light pattern being adjustable by appropriate command of the illuminating displays.

The invention is particularly interesting in that it provides a three-dimensional definition of the outer surface of the object, including local deformations like those of hail damages on a bodywork of a vehicle. The use of reflectometry for determining a three-dimensional definition is particular interesting for reflective surface because classical 3D scanning systems are not suitable for such surfaces. Also, with the invention, three-dimension camera and distance sensors are not necessary.

DRAWINGS

DETAILED DESCRIPTION

Figure 1:
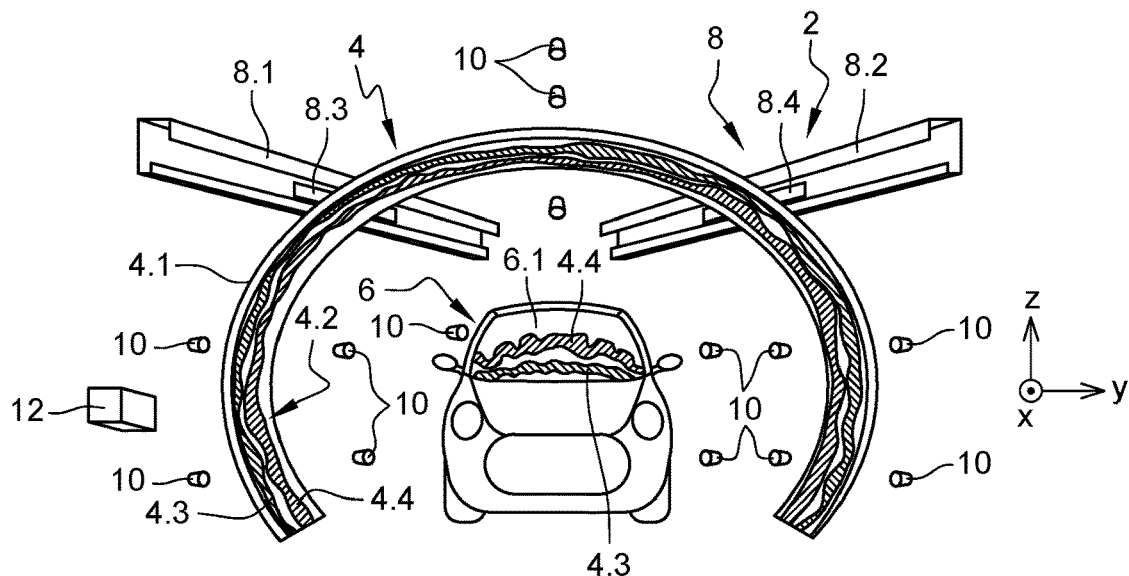
FIG. 1 is a perspective view of a system for scanning an outer surface of a three-dimensional object, according to the invention.

FIG. 1 is a perspective view of a system for scanning an outer surface of a three-dimensional object like the bodywork of a vehicle, according to the invention. The present invention involves reflectometry, meaning that any other object than a vehicle can be scanned provided that its outer surface is reflective, or at least partly reflective.

The system 2 comprises an arch 4 comprising a frame 4.1 and an illuminating device 4.2 arranged on the frame 4.1. The illuminating device 4.2 is arranged on an inner face of the frame 4.1 and is configured so as to emit a light pattern at least approximately toward a centre of the arch, where the object 6 to be scanned is located.

The light pattern emitted by the illuminating device 4.2 comprises for instance two illuminated strips 4.3 and 4.4 extending essentially in parallel along the arch 4. As this is apparent each of the two illuminated strips 4.3 and 4.4 shows opposed borders with non-straight profiles. These profiles can be periodic but comprise aperiodic non-straight sub-profiles in each period. The illuminating device 4.2 is configured to project onto the object 6 two strips of light corresponding to the illuminated strips 4.3 and 4.4 visible on the illuminating device. These projected illuminated strips are visible on the windshield 6.1 of the object being for instance a vehicle 6. The lower projected illuminated strip with the hatching inclined to the top right (i.e., ///) is formed by the illuminated strip 4.3 (with the same hatching) and the higher projected strip with the hatching inclined to the top left (i.e., \\\) is formed by the illuminated strip 4.4 (with the same hatching).

The device 2 is configured for operating a relative movement along the x longitudinal direction between the arch 4 and the object 6. To that end, the arch 4 is advantageously movable along the x direction so that the object 6 can remain immobile. For instance the arch 4 is supported by a translation unit 8 comprising two parallel longitudinal beams 8.1 and 8.2 located at distance from the ground so that the centre of gravity of the arch 4 is below the height of the beams 8.1 and 8.2. Two motorized trolleys 8.3 and 8.4 cooperate with the two beams 8.1 and 8.2, respectively, for carrying and translating the arch 4. The motorization of the trolleys is configured for achieving a constant translational speed of the arch. It is understood that other drive means can be considered such as driving belts, pinion and rack systems, etc.

The system 2 comprises a series of cameras 10 for recording images of the light pattern reflected by the outer surface of the object 6. The cameras are fixed, i.e., immobile, and connected to a computing unit 12. Each camera is selected, positioned and oriented for capturing images of a specific portion of the outer surface of the object 6. For instance at least 4 cameras are provided on each lateral side and at least 3 cameras are provided at the top. The number and arrangement of the cameras 10 depend on the shape and size of the object.

Figure 2:
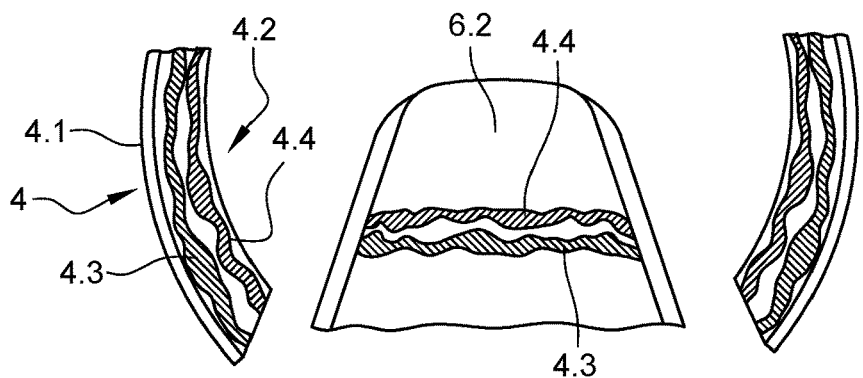
FIG. 2 is a view of the roof of a vehicle onto which a light pattern is projected by the system of FIG. 1.

FIG. 2 is a detailed view from the top of the roof 6.2 of the vehicle 6, where the two light strips of the light pattern produced by the illuminating device 5.2 are visible. Side portions of the arch 4 are visible. It is however understood that the two illuminated strips on the roof 6.2 are produced by a top portion (not represented in FIG. 2) of the illuminating device on the arch 4.

In operation, the light pattern moves along the longitudinal direction while the arch 4 is moving. During that movement, each camera 10 sees a specific portion of the outer surface of the object and sees the light pattern moving along that portion. The recorded reflection images are transmitted to the computing unit which then runs an image processing to determine the outline of the light patterns, i.e., the front and rear borders of the illuminated strips. That determination can be easily made by detecting the contrast between the light pattern which is illuminated and the rest of the image which is comparatively dark. Once the outline and profile of these borders are determined, their displacement along the image correlated with the speed of the relative movement between the light pattern and the object enables to determine a three-dimensional definition of the outer surface. The principles underlying that determination are explained here below.

Figure 3:
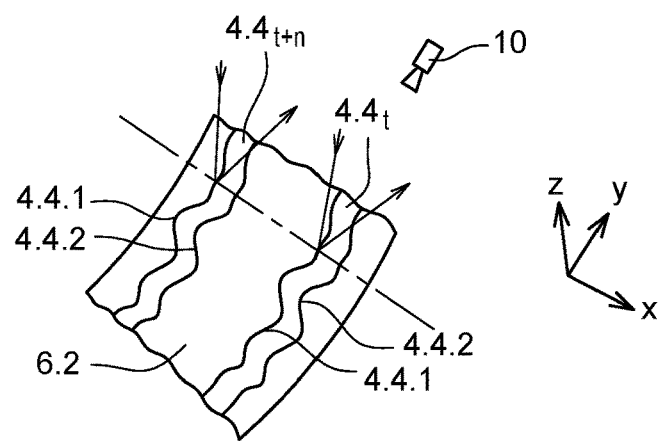
FIG. 3 illustrates in a schematic way the reflection of the moving light pattern on the windshield of the vehicle.

FIG. 3 is a schematic representation of the windshield 6.2 of the vehicle 6, showing a light strip moving along the longitudinal direction (axis x) at a given speed. More specifically, two illuminated strips $4.4_t$ and $4.4_{t+n}$ are represented, one below $4.4_t$ corresponding at a time t and one above $4.4_{t+n}$ corresponding at a time t+n. An incident light ray forming the front border 4.4.1 of the light strip 4.4 is represented at the time t and the time t+n. This light ray is reflected towards one of the cameras 10. The moving incident light ray shows a constant orientation, meaning that detecting the displacement of its reflection while knowing the displacement speed of the incident light ray provides information about the position of the surface in the x-z plane. Considering that the incident light ray is vertical (along the z axis) and that the camera is looking at the windshield from above (as illustrated) if the windshield is steep (i.e., close to vertical), the distance between the reflected rays at the time t and t+n will be shorter than if the windshield is flat (i.e., close to horizontal).

Figure 4:
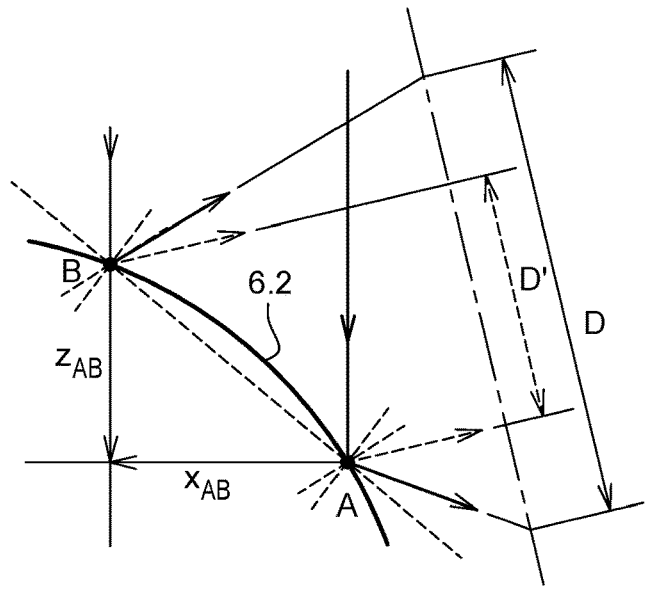
FIG. 4 illustrates in a schematic way how the coordinates of the outer surface of the objection can be determined by processing the recorded reflexion images, based on the speed of the relative movement between the light pattern and the object.

FIG. 4 illustrates the influence of the curvature of a reflection surface on the image reflected by the surface. The surface can be the one of the windshield 6.2 for illustrative purposes, being understood that this applies to any other types of surface of the object. For comparison purposes, two portions of surface are represented, i.e., a curved one 6.2 in continuous line and a straight one in dashed line, both passing at the points A and B. Two parallel incident light rays are represented, one incident on point A at a time t and one incident on point B at a time t+n. The reflected rays at these points will however show different orientations depending on the curvature of the surface. The straight profile (dashed line) of the surface will show a distance D' at a given capturing plane whereas the curved profile will show a larger distance D at the same plane. This is typically what happens when someone sees his reflection in a concave or convex mirror compared with a plan mirror. Therefore, knowing the speed of displacement of the incident light ray between the times t and t+n, the curvature of the surface at the points A and B and the displacement of the reflected ray, by means the camera, enables to determine coordinates $x_{AB}$ and $z_{AB}$ between the two points A and B.

The local curvature of the surface can be determined by monitoring the width variations of the illuminated strip while it moves along the surface. For a given general inclination of a surface relative to the incident light pattern, a convex surface will show a larger width of the light pattern while a convex surface will show a narrower width of the light pattern.

Figure 5:
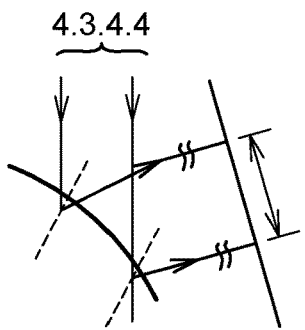
FIGS. 5 and 6 illustrate in a schematic way the influence of the inclination and curvature of a reflecting surface on the width of the reflected light pattern.
Figure 6:
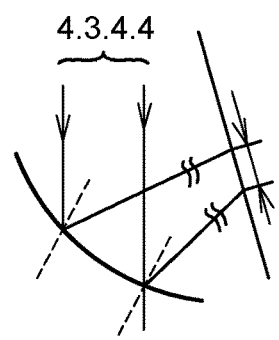

The above consideration is illustrated in FIGS. 5 and 6. FIG. 5 shows two vertical incident light rays delimiting the front and rear borders of one of the illuminated strips 4.3 and 4.4. These rays are incident on a convex surface reflecting the illuminated strip with a larger width. FIG. 6 shows, similarly to FIG. 5, two vertical incident light rays delimiting the front and rear borders of one of the illuminated strips 4.3 and 4.4, impinging on a convex surface, showing a same average inclination as the one in FIG. 5. The illuminated strip reflected on a same plane shows a narrower width as in FIG. 5. This means that monitoring the width variation of the light pattern while it is moving along the surface provides accurate information about the inclination and curvature of the surface.

Figure 7:
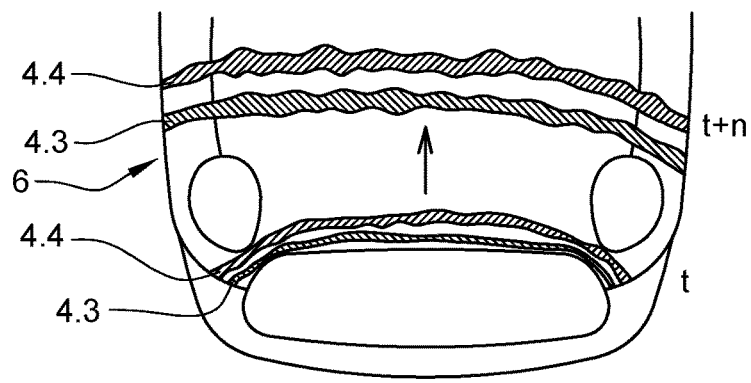
FIG. 7 illustrate the light pattern produced with the system of FIG. 1 into the vehicle, at a first position directly before the headlights and as second position on the bonnet.

FIG. 7 shows the light pattern at two different positions, i.e., two different points in time, e.g., t and t+n, on the font part of the vehicle 6. The light pattern at the time t shows two narrow illuminated strips 4.3 and 4.4, essentially because the surface on which the light pattern is projected is inclined relative to the projection direction, whereas the light pattern at the time t shows two wider illuminated strips 4.3 and 4.4, essentially because the surface on which the light pattern is projected is less inclined, for instance nearly perpendicular to the projection direction.

The non-straight profile of the front and rear borders of the illuminated strips forms a kind of signature, known from the computing unit, allowing to apply the same principle as explained above in a transversal direction, i.e., in the y direction. Said differently, in the recorded reflection images of the light patterns, any point of its outline, for instance on the front and rear borders, can be identified, meaning that this point will move not only longitudinally, i.e., along the x direction, but potentially also transversally, i.e., along the y direction, depending on the transversal curvature and inclination of the surface from which this point originates. Transversal extensions or contractions of the light pattern provide information about the transversal curvature and inclination of the surface.

The transversal non-straight profile of the light pattern must not periodic. A periodic profile simplifies the parametrization of the computing unit, for the definition of the profile requires only a portion therefore to be properly parametrized, the rest being obtained by replication. The number of periods for is greater than 2 and/or less then 10.

The use of several illuminated strips in the light pattern provides some redundancy useful for correction potential errors or inaccuracies.

The speed of the relative movement between the light pattern and the object can be obtained from the translation unit. If can also be obtained, calibrated, corrected and/or confirmed, by detecting the moving speed of the reflected light pattern captured by the cameras. However, in to avoid any influence of the surface of the object, the speed of the light pattern can be determined by computing the moving speed of the light pattern captured directed by the cameras, i.e., without reflection on the surface of the object. The cameras can indeed be positioned and arranged such that at any moment of the relative movement between the light pattern and the object, at least one camera, in various instances at least two cameras see directly a portion of the light pattern. The computing unit can then be setup to process the images so as to successively collect information about the relative speed from different cameras. The angle between the optical axis of each of these cameras and the movement direction can be determined for all positions of the light patterns so as to determine correct values of the speed of the relative movement.

The computing unit can also be setup for detecting local deformations of the outer surface of the object, for instance hail damages on the bodywork of a vehicle, by analysing the local distortions of the outline of the light pattern, for instance local deformations of the front and/or rear borders of the illuminated strips, these distortions corresponding to the slope of the surface where it is deformed.

However the above described process and system according to the present invention readily provide such information by determining a three-dimensional definition of the outer surface of the object, including the local deformation such as those resulting from hail damages on a bodywork of a vehicle.

The invention claimed is:

1. A method for scanning an outer surface of a three-dimensional object, the outer surface being reflective, said method comprising the following steps:
   (a) projecting a light pattern on the object with a relative movement between the light pattern and the object;
   (b) recording with cameras images of the light pattern reflected by the outer surface during the relative movement; and
   (c) processing the recorded reflection images by identifying the outline of the light pattern and determining from the outline characteristics of the outer surface;
   wherein the light pattern comprises at least one homogenously illuminated strip extending transversally to a direction of the relative movement with at least one border with a non-straight profile so as to form a non-constant width of the strip; and
   wherein in step (c) the speed of the relative movement is taken into account for determining a three-dimensional definition of the outer surface.

2. The method according to claim 1, wherein the speed of the relative movement is at least one of determined, calibrated, checked and readjusted in step (c) by processing the recorded reflection images.

3. The method according to claim 1, wherein step (b) comprises recording direct images of the light pattern.

4. The method according to claim 3, wherein the speed of the relative movement is at least one of determined, calibrated, checked and readjusted in step (c) by processing the recorded direct images.

5. The method according to claim 1, wherein in steps (a) and (b) the object is at standstill and the light pattern is moving.

6. The method according to claim 5, wherein the cameras in step (b) are immobile so as to record fixed portions of object respectively.

7. The method according to claim 1, wherein the light pattern is formed on an arch extending around the object, the light patterns being projected towards a center of the arch.

8. The method according to claim 1, wherein the light pattern comprises two of the at least one homogenously illuminated strip.

9. The method according to claim 1, wherein in step (c) determining a three-dimensional definition of the outer surface is based on displacement of at least one of the borders of the at least one homogeneously illuminated strip, correlated with the speed of the relative movement and variations of the width of the at least one homogeneously illuminated strip.

10. The method according to claim 1, wherein the non-straight profile of the at least one border of the at least one homogeneously illuminated strip is periodic.

11. The method according to claim 10, wherein each period of the non-straight profile of the at least one border of the at least one homogeneously illuminated strip comprises an aperiodic sub-profile.

12. The method according to claim 10, wherein the number of periods is at least one of:
   greater than 2; and
   less than 10.

13. The method according to claim 1, wherein in step (c) local deformations of the outer surface are determined by detecting local variations of the non-straight profile of the at least one border of the at least one homogeneously illuminated strip.

14. The method according to claim 13, wherein the object is a vehicle with bodywork and the deformations are associated to hail damages to the bodywork.

15. A system for scanning an outer surface of a three-dimensional object, comprising:
   an illuminating device configured for producing a light pattern and for a movement of the light pattern relative to the object;
   a plurality of cameras configured for recoding images of the light pattern reflected by the outer surface during the relative movement; and
   a computing unit connected with the camera and configured for processing the recorded reflection images by identifying the outline of the light pattern and determining from the outline characteristics of the outer surface;
   wherein the light pattern comprises at least one homogenously illuminated strip extending transversally to a direction of the relative movement with at least one border with a non-straight profile so as to form a non-constant width of the strip; and
   wherein the computing unit is configured for carrying out a method comprising the following steps:
   (a) projecting a light pattern on the object with a relative movement between the light pattern and the object;
   (b) recording with cameras images of the light pattern reflected by the outer surface during the relative movement;
   (c) processing the recorded reflection images by identifying the outline of the light pattern and determining from the outline characteristics of the outer surface;
   wherein the light pattern comprises at least one homogenously illuminated strip extending transversally to a direction of the relative movement with at least one border with a non-straight profile so as to form a non-constant width of the strip; and
   wherein in step (c) the speed of the relative movement is taken into account for determining a three-dimensional definition of the outer surface.

16. The system according to claim 15, wherein the illuminating device forms an arch with a C-shape whose opening is oriented downwardly.

17. The system according to claim 15, further comprising two parallel and horizontal rails supporting the illuminating device movable in translation along the rails.

18. The system according to claim 17, further comprising two side frames supporting the two parallel and horizontal rails and the cameras.

19. The system according to claim 17, further comprising a motorization of the movement in translation of the illuminating device along the two parallel and horizontal rails, the motorization comprising an output configured to provide to the computing unit information about the speed of the relative movement.

20. The system according to claim 15, wherein the illuminating device comprises illuminating displays for producing the light pattern, the light pattern being adjustable by appropriate command of the illuminating displays.

\* \* \* \* \*